United States Patent
Zajac et al.

(10) Patent No.: US 6,437,559 B1
(45) Date of Patent: Aug. 20, 2002

(54) DEVICE FOR MEASURING THE VELOCITY OF A MAGNETICALLY RECEPTIVE OBJECT

(76) Inventors: Gerry W. Zajac, 2 So. 624 Marie Curie La., Warrenville, IL (US) 60555; James M. Gallas, 1615 Wood Quail, San Antonio, TX (US) 78248; Richard Panosh, 101 S. Canyon Dr., Bolingbrook, IL (US) 60490

( * ) Notice: Subject to any disclaimer, the term of this patent is extended or adjusted under 35 U.S.C. 154(b) by 0 days.

(21) Appl. No.: 09/746,387

(22) Filed: Dec. 21, 2000

(51) Int. Cl.$^7$ ................................ G01P 3/66; G01P 3/80

(52) U.S. Cl. ........................................ 324/179; 473/222

(58) Field of Search ................................ 324/160, 173, 324/179, 178, 180, 236, 233, 162, 166; 473/222, 318

(56) References Cited

U.S. PATENT DOCUMENTS 4,615,526 A  * 10/1986  Yasuda et al. ............... 273/183
5,935,014 A  *  8/1999  Lindsay ....................... 473/222

* cited by examiner

Primary Examiner—Edward Lefkowitz
Assistant Examiner—Subhash Zaveri
(74) Attorney, Agent, or Firm—Robert L. Marsh

(57) ABSTRACT

A device for measuring the speed of a golf club has a pair of coils spaced a given distance apart with each of the coils forming an oscillating electro-magnetic field which are positioned to interrupt the course of the head of a golf club. When a golf club head successively passes through the first and second oscillating magnetic fields, the natural frequency of the combined fields is altered. A detector circuit including a phase locked loop detects the change in frequency as the club successively pass through the two fields and the time elapsed is measured by a clock and recorded in the memory of a microprocessor which uses the information, along with the given distance between the fields to calculate the speed of the club.

15 Claims, 2 Drawing Sheets

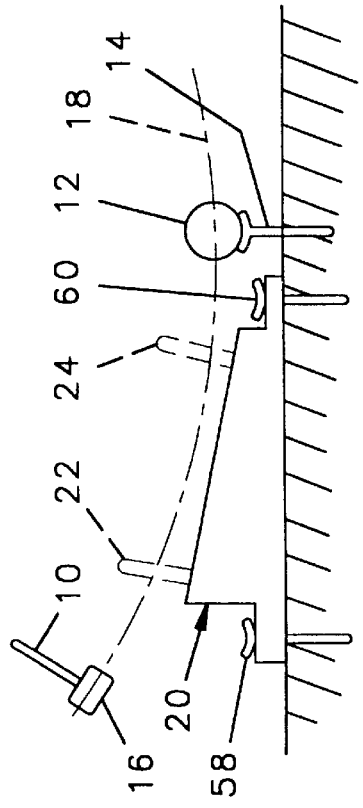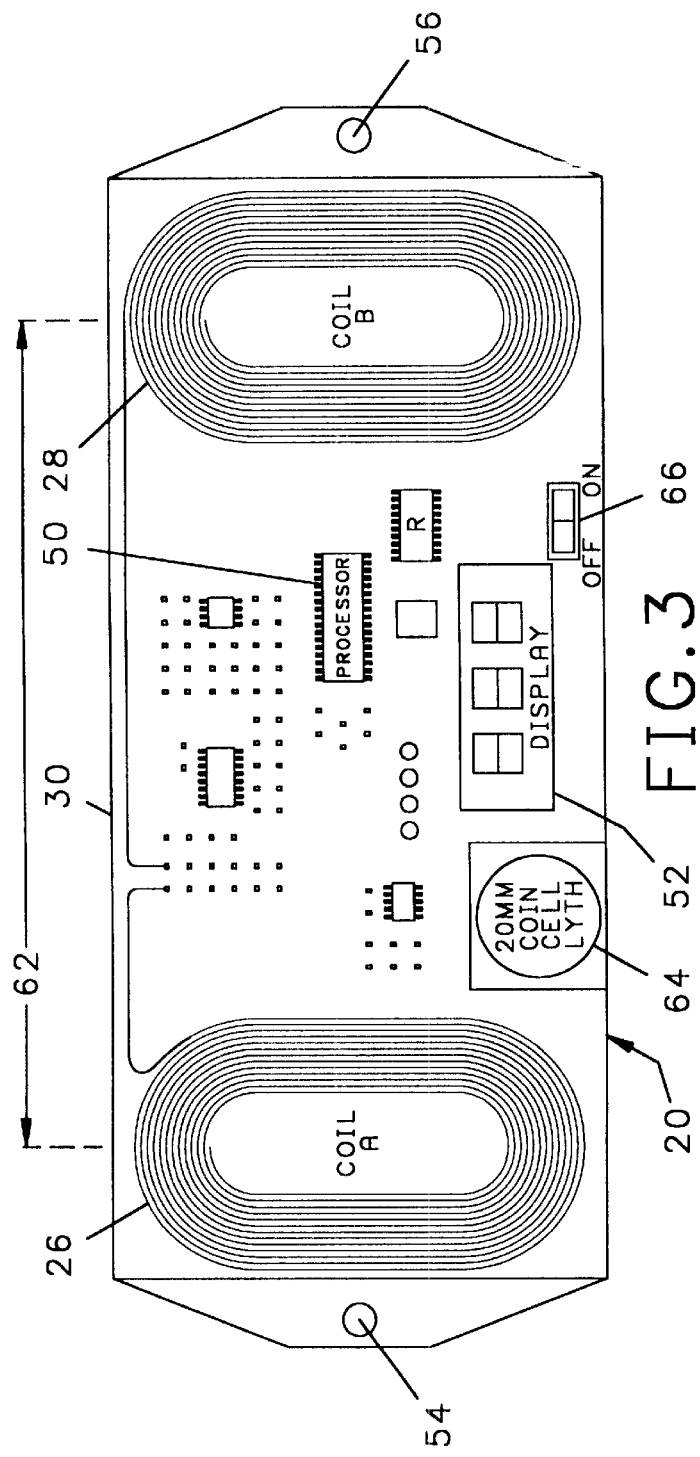

DEVICE FOR MEASURING THE VELOCITY OF A MAGNETICALLY RECEPTIVE OBJECT

The present invention relates to the use of magnetic fields to measure the speed of a moving object, and in particular, to measure the speed at which a player swings the head of a golf club.

BACKGROUND OF THE INVENTION

Golf is a highly competitive sport in which a skilled amateur can challenge his professional counterparts because the basics to a good game of golf is "all in the swing." A player with a long drive has a distinct advantage over a player with a shorter drive and the length of the drive is greatly related to the speed at which the club hits the ball. In addition to the speed of the club when it contacts the ball, a player is also interested in a consistent "back swing time." The back swing time is the interval of time which elapses from when the club is drawn back from the ball until the ball is driven off the tee.

Currently, optical velocity meters or Doppler radar guns are used to measure golf club speed. An optical meter requires a strip of reflective tape mounted on the club so that motion of the club can be detected by the device. The radar gun must be placed several feet from the golfer to prevent the club from striking the gun. The optical meter can measure back swing time, but the radar gun cannot. Both devices are expensive and suitable for use on a practice tee, but are not suitable for use by a golfer during the course of playing a game.

It would be desirable to provide an improved apparatus for measuring the speed of a golf club which would be inexpensive to manufacture, small in size, and useable by a player during the course of a game.

SUMMARY OF THE INVENTION

Briefly, the present invention is intended to measure the speed of an object having a magnetically conductive element by passing the conductive element through a pair of oscillating magnetic fields. Specifically, the invention is used to measure the speed of a metal club head by positioning a pair of magnetic fields to cross the path of movement of the club head either immediately before or immediately after it strikes the golf ball.

In accordance with the invention, two oscillating magnetic fields are formed with the natural frequencies of the fields being equal to each other. When a magnetically conductive element, such as the head of a golf club, passes through one of the oscillating magnetic fields, the movement of the magnetically conductive object through the field steals energy away from the field, thereby altering the natural frequency of the field. The invention includes a detector for detecting a change in the natural frequency of oscillation of each of the fields and a clock for measuring the time that elapses between the interruptions of the first and second fields. The fields are spaced a predetermined distance from each other and, therefore, the speed of the club can be calculated by dividing the distance between the fields by the time required to pass between them.

The above described method is best carried out by providing a pair of oval shaped coils etched into the surface of a printed circuit board. To maximize sensitivity, the coils can be etched into both the upper and lower surfaces of the circuit board thereby doubling the number of turns. By etching the coils at opposite ends of a single circuit board, the distance between the coils is fixed.

The device need only detect the time required to cross the two fields. It is not necessary to detect the direction of motion. The circuit can therefore be simplified by arranging the coils in series with a common capacitor to thereby insure that the frequencies of the two coils are identical. Frequency changes are detected by a phase locked loop consisting of a digital phase detector and a voltage control oscillator (VCO). The phase locked loop matches the edges of the wave from the magnetic field with that of the VCO and generates an error voltage which is fed back to the VCO to maintain the frequency of the VCO equal to the natural frequency of the magnetic field formed by the coils. When a golf club enters the field of one of the coils, the frequency of the combined coils is altered causing the VCO to adjust the error voltage in response to the frequency change.

In accordance with the invention, the output from the phase locked loop is passed through a passive filter which assists in maintaining the matched frequencies and filters out extraneous noise. The output from the filter is passed through an amplifier which amplifies any spikes in voltage caused by a change in the frequency of the oscillating magnetic fields. The output from the amplifier is passed through a comparator for detecting voltage spikes above a given threshold where the threshold is indicative of a conductive object, such as the head of a golf club entering one of the magnetic fields. The output from the comparator is directed into a microprocessor having a clock which measures the time between spikes. The time between the spikes and the distance between the magnetic fields are then used to calculate the speed, and the calculated output is then displayed on an output in miles per hour or the like.

Although the invention is disclosed as usable to measure the speed of a golf club swing, the invention can be used to measure the speed of any projectile or the device used to impart speed to a projectile. Examples of alternate uses include measuring the speed of a baseball, a baseball bat, a tennis racket, a tennis ball, a foot ball, a soccer ball, a basketball, a shot put, a javelin, a track runner, or the hands and feet of one practicing karate.

BRIEF DESCRIPTION OF THE DRAWINGS

A better and more complete understanding of the present invention will be had after a reading of the following detailed description taken in conjunction with the drawings wherein:

FIG. 1 is a schematic diagram of a moving golf club head following a path which will interrupt the oscillating magnetic fields provided by the present invention;

FIG. 3 is a top elevational view of circuit board having coils etched in the surface therefore and some of the components required for the present invention.

DETAILED DESCRIPTION OF THE PREFERRED EMBODIMENT

Figure 2:
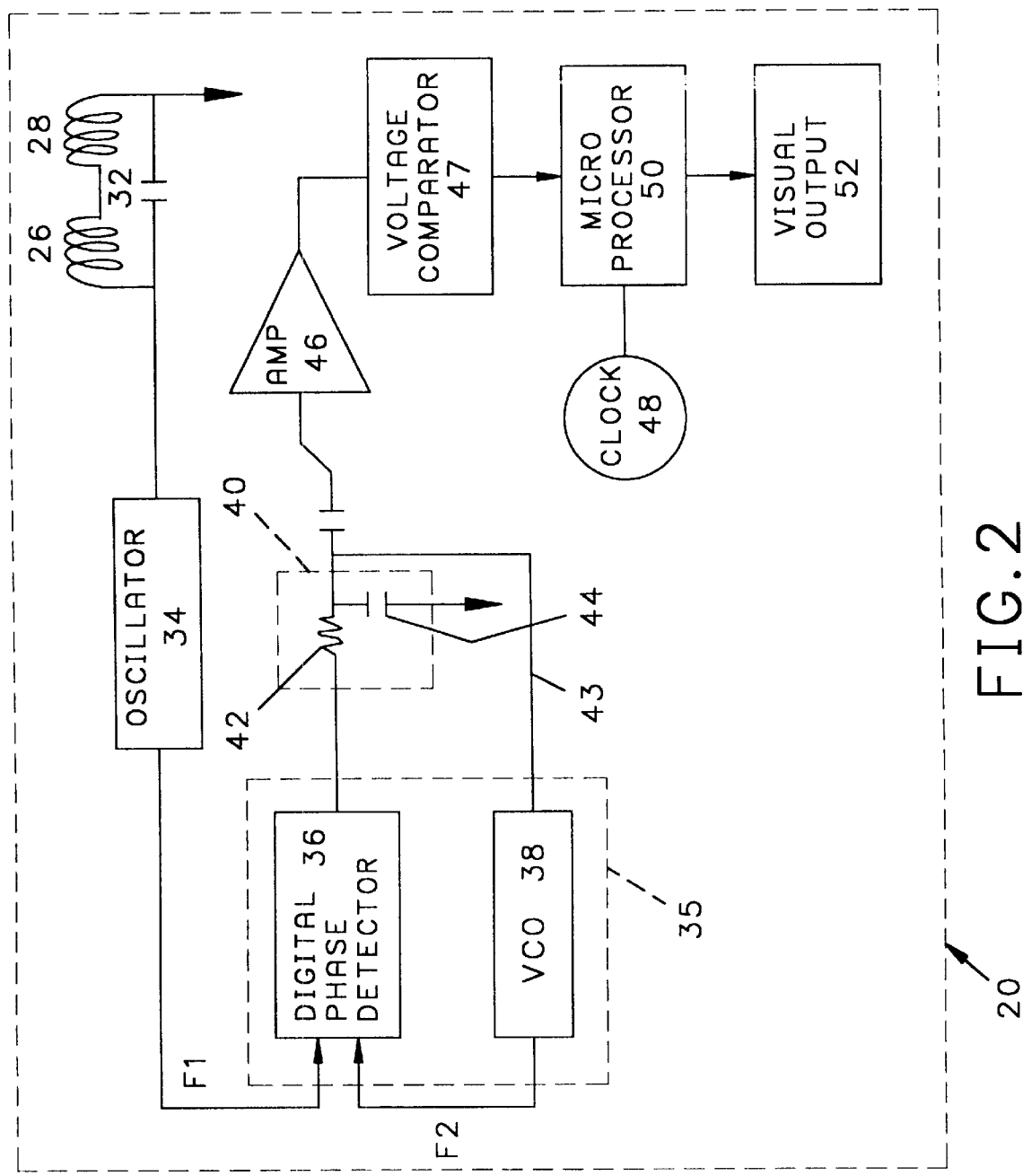
FIG. 2 is a block diagram of the circuit of the present invention.

Referring to FIG. 1, to properly swing a golf club 10 and strike a ball 12 mounted at the upper end of a tee 14, a golfer will swing his club such that the head 16 thereof passes through an arc 18. Ideally, the ball 12 will be struck by the center of the face of the head 16, and any reasonably competent golfer can position a device 20 in accordance with the present invention such that the arc 18 of the moving head 16 will pass between one half inch and one inch above the upper surface thereof.

In accordance with the present invention, the device 20 forms a first standing oscillating magnetic field 22 and a second standing oscillating magnetic field 24. When the device 20 is positioned near the golfer's tee 14, the moving head 16 will successively interrupt the fields 22, 24 immediately before or immediately after it strikes the ball 12.

Referring FIG. 2 and 3, the magnet fields 22, 24 are formed by adjacent coils 26, 28. We have found that the ideal coils 26, 28 for forming oscillating fields are etched on opposite ends 27, 29 of the circuit board 30. To maximize the inductance of the coils 26, 28, and therefor the sensitivity, the number of loops of the coils can be doubled by etching coils on both upper and the lower surfaces of the board 30.

As shown in FIG. 2, the coils 26, 28 arranged in a series with a capacitor 32 the resonant frequency ($F_1$) of which is given by the formula:

$$F_1 = 1/2\Pi\sqrt{LC} = 1/(2\Pi\sqrt{LC})$$

where L is inductance of the coils 26, 28 and C is the capacitance of the capacitor 32. An oscillator 34 is connected in the circuit to drive the oscillating magnetic fields 22, 24, and generates a sinewave having a natural frequency $F_1$. The output of the oscillator is directed into a phase locked loop 35 consisting of a digital phase detector 36 and a voltage controlled oscillator (VCO) 38. The VCO generates a second wave $F_2$ and the phased locked loop matches the frequency $F_2$ from the VCO with frequency $F_1$ to generate an error voltage. The error voltage is fedback to the VCO to maintain $F_2$ equal to $F_1$.

When a magnetic element, such as the head of a golf club, enters one of the fields 22, 24, the movement of the golf club through the field will draw energy away from the field, causing changes in the natural frequency $F_1$ of the system. The change in the natural frequency $F_1$ will force a complimentary change in $F_2$ and thereby alter the error voltage emitted by the phase locked loop.

Phase locked loops and VCOs are commercially available and we have found that a chip sold as 74HC4046A, a CMOS, is a low powered device having three different phased detectors of which detector two is suitable for use in the present invention. Similarly, we have found that a VCO having a frequency adjusted to track over ±250 kHz is suitable for use in the present invention. We have also found that suitable coils can be formed by providing fifteen turns on the upper surface of the circuit board 30 and 15 turns on the lower surface with each of the coils being generally oval shape with an approximate overall length 39 of 3-¼" and an approximate overall width 41 of 1-⅞".

Referring further to FIG. 2, the average DC in the control loop 43 is best maintained by providing a passive filter 40 which is depicted herein as consisting of a resistor 42 and a capacitor 44. The output of the filter 40 is directed to an amplifier 46, which preferably has a gain of 10. A MAXIM 954 dual operational amplifier and voltage comparator is suitable for this purpose. Following the amplifier 46 is a voltage comparator 47 which is biased about 40 mV below the amplified quiescent DC level. This places the point at which the club head trips a detectable frequency change near the middle of each of the coils 26, 28. The voltage comparator 47 also provides a square wave which starts or stops the clock 48 of a microprocessor 50. An analog OP250 dual operational amplifier is suitable for this purpose. Alternatively, amplifiers and dedicated voltage comparators are also suitable.

The microprocessor 50 receives pulses from the comparator 47 and looks for two pulses in quick succession which are indicative of a golf swing, and measures the speed thereof. The calculated speed in miles per hour or other suitable dimensions is projected on a visual output 52. The micro processor 50 also looks for a third signal which precedes the pair of signals indicative of a swing, the third signal being generated during the beginning of a back swing. The back swing time can then be calculated as the time elapsing between the third signal and the dual signals indicative of a swing. Both the back swing time and the golf club speed during a swing can be projected on the output 52.

Referring to FIGS. 1 and 3, to safely retain the device 20 while a golfer swings his club 10, the device includes a pair of holes 54, 56 at the ends thereof having diameters suitable for receiving the ends of two golf tees 58, 60 for pinning the device 10 to the ground near the ball 12, as shown. Preferably, the centers of the coils 26, 28 are spaced a distance 62 of about five inches from each other. The device 20 is powered by a small battery 64 and the device is operated by a simple switch 66.

While the present invention is described with respect to a single embodiment, it will be appreciated that many modifications and variations can be made without departing from the true spirit and scope of the invention. It is, therefore, the intent of the appendant claims to cover all such modifications and variations which fall within the true spirit and scope of the invention.

What is claimed:

1. The method of measuring the speed of an object having a magnetically conductive portion where said object is moving along a predetermined path, said method comprising the steps of forming a first standing oscillating magnetic field having a first predetermined natural frequency, positioning said first standing oscillating magnetic field in said predetermined path, forming a second standing oscillating magnetic field having a second predetermined natural frequency, positioning said second standing oscillating field in said predetermined path and spaced a fixed distance from said first field, detecting a change in the frequencies of oscillation of said first and said second fields, measuring the time elapsed between said changes in frequencies of first field and said second field, and dividing said fixed distance by said measured time to calculate said speed of said object.

2. The method of claim 1 wherein said first predetermined frequency is equal to said second predetermined frequency.

3. A device for measuring the speed of an object having a magnetically conductive element therein where said object moves along a predetermined path, said device comprising first means for forming a first standing oscillating magnetic field having a first predetermined natural frequency, second means for forming a second standing oscillating magnetic field having a second predetermined natural frequency, said first means and said second means spaced a fixed distance from each other, means for driving said oscillating fields formed by said first means and said second means, detector means for detecting a change in said natural frequency of said first means and said second means, and means for measuring the time elapsed between the successive detectable changes in said natural frequencies of said first means and said second means.

4. The device of claim 3 wherein said first predetermined natural frequency is equal to said second predetermined frequency.

5. The device of claim 3 wherein said first means comprises a first coil and said second means comprises a second coil.

6. The device of claim 3 wherein said detector means comprises a phase locked loop.

7. The device of claim 6 wherein said phase locked loop comprises a digital phase detector and a voltage controlled oscillator.

8. The device of claim 7 wherein said phase locked loop is maintained by a passive filter.

9. The device of claim 6 wherein said detector means further includes a comparator for detecting spikes indicative of a conductive object entering one of said first and second oscillating magnetic fields.

10. The device of claim 9 and further comprising a microprocessor.

11. The device of claim 9 and further comprising a visual output.

12. The device of claim 10 wherein said means for measuring time is a digital clock within said microprocessor.

13. A device for measuring the speed of an object having a magnetically conductive element therein where said object moves along a predetermined path, said device comprising a first coil for forming a first standing oscillating magnetic field having a first predetermined natural frequency, a second coil for forming a second standing oscillating magnetic field having a second predetermined natural frequency, said first coil and said second coil spaced a fixed distance from each other, means for driving said oscillating fields formed by said first coil and said second coil, a phased locked loop for generating a DC voltage indicative of steady state frequencies of said standing oscillating magnetic fields formed by said first coil and said second coil and for generating a spike indicative of a change in frequency of one of said first predetermined frequency and said second predetermined frequency, a comparator for identifying a spike indicative of a magnetically conductive material in one of said fields, and a clock for measuring the time elapsed between the successive detectable changes in said natural frequencies of said first coil and said second coil.

14. The device of claim 13 and further comprising a read out for visually projecting the speed of an object moving through said first and second oscillating fields.

15. The device of claim 14 and further comprising a microprocessor.

* * * * *